(12) United States Patent
Lee (10) Patent No.: US 6,445,488 B1
(45) Date of Patent: Sep. 3, 2002

(54) MICRO-MIRROR DEVICE AND OPTICAL PICK-UP SYSTEM OF THE SAME

(75) Inventor: Young Joo Lee, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/573,198

(22) Filed: May 18, 2000

(30) Foreign Application Priority Data

May 26, 1999 (KR) .............................................. 99-19050

(51) Int. Cl.[7] ........................ G02B 26/00; G02B 26/08; G02B 7/02; G11B 7/00
(52) U.S. Cl. ........................ 359/291; 359/224; 359/824; 369/44.15
(58) Field of Search ................................. 359/291, 292, 359/290, 293, 224, 295, 813, 814, 823, 824; 369/44.11, 44.14, 44.15

(56) References Cited

U.S. PATENT DOCUMENTS

| | | | |
|---|---|---|---|
| 5,717,667 A | * | 2/1998 | Horimai et al. .......... 369/44.23 |
| 6,028,689 A | * | 2/2000 | Michalicek et al. ........ 359/224 |
| 6,266,315 B1 | * | 7/2001 | Lee et al. .............. 369/112.01 |

* cited by examiner

Primary Examiner—Georgia Epps
Assistant Examiner—William Choi
(74) Attorney, Agent, or Firm—Morgan, Lewis & Bockius LLP (57) ABSTRACT

Micro-mirror device and an optical pick-up system of the same, the optical pick up system including a light source module for emitting a light, a first and a second focusing parts for focusing the light emitted from the light source module onto a surface of an optical recording medium, and a micro-mirror device between the first and second focusing parts for fine adjustment of a position of the light incident through the first focusing part, reflecting to the optical recording medium through the second focusing part, sensing the light re-reflected at the optical recording medium, and converting into an electrical signal, thereby permitting fabrication of a micro optical system by integrating/packing optical components, such as the mirror, the optical signal detecting photodiode, and the beam positioning device, saving a production cost by using silicon semiconductor fabrication process and micro-machining, and enhancing a positioning preciseness of the light by coupling micro actuator for driving the mirror.

18 Claims, 6 Drawing Sheets

$d = \sqrt{2}h$

MICRO-MIRROR DEVICE AND OPTICAL PICK-UP SYSTEM OF THE SAME

BACKGROUND OF THE INVENTION

1 Field of the Invention

The present invention relates to an optical pick-up for a high density optical recording medium, and more particularly, to a micro-mirror device for controlling a position of beam and detecting an optical signal, and an optical pick-up system of the same.

2 Background of the Related Art

The recent rapid development of the multimedia technology is made possible owing to development of faster, and low cost large sized information storage devices. The improvement of PC performance, the rapid spreading of data communication, such as the internet, and the debut of VOD (Video On Demand) and the high definition TVs strongly demand for large sized information storage media which can process a large amount of data, inclusive of moving pictures and audio signals, further. Though there are magnetic storages which are made to meet such demands by increasing a storage density and capacity of existing HDD (Hard Disk Drive), it is known that it is very difficult to realize a magnetic storage with a density over 10 giga bytes per square inch due to a physical limitation of recording density.

Figure 1:
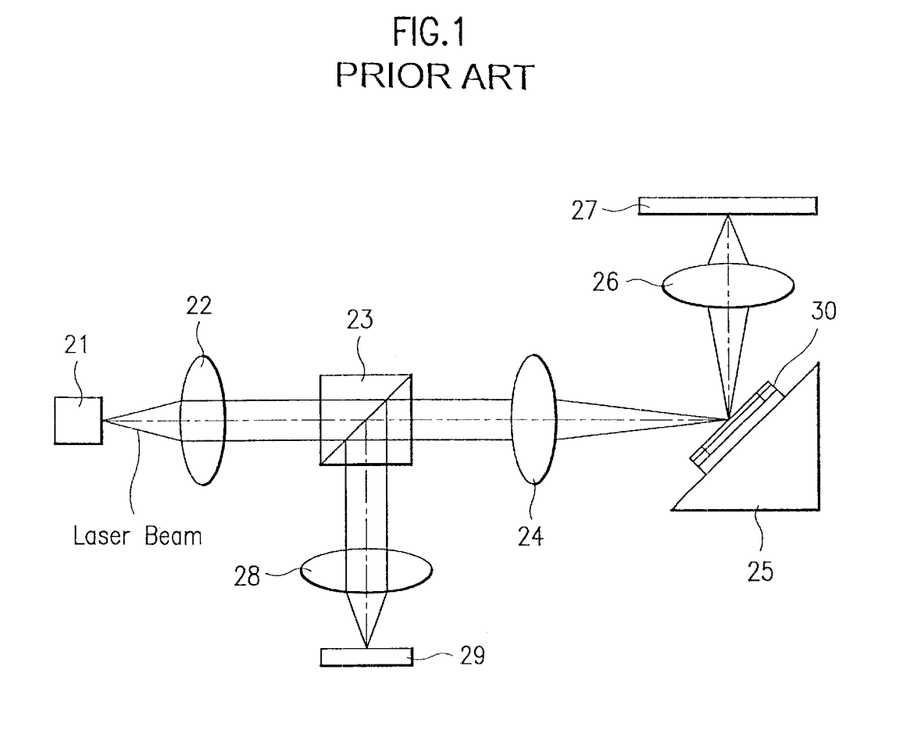
FIG. 1 illustrates a related art optical pick up, schematically.

Starting from popularization of compact disks, the optical information storage is settled as a major supplementary storage for PC, and is being developed to put DVD (Digital Versatile Disc) systems, which can be applicable to a wide multimedia environment, into practical use. Particularly, the optical information storage is advantageous in that it has a fast response speed and pick-up of non-contact type, and especially, a data density as high as a range of a wavelength of writing/reading laser beam can be available. However, the higher density of data implies a reduction of a track pitch, a distance between data bits or tracks, as much as a range of a wavelength of the writing/reading laser beam. Therefore, an optical system which can control a position of the writing/reading laser beam to direct the laser beam to a position of the track pitch accurately is an important task of the high density optical information storage. The micro optical system emerged owing to micromachining technology is assumed to be a technology which can realize control of the micro laser beam displacement mentioned before. Not only the optical information storage field, but also the example of the DMD (Digital Mirror Display) of the Texas Instrument, a new concept display, are examples of application of a micro mirror array, a micro optical device. And, the application of the micro optical device implemented by the micromachining is in a wide spreading trend, such as a paper on study for a laser beam scanner for reading a bar code by using polycrystalline silicon surface micromachining (J. Microeletromech. Syst. vol. 7, no. 1, pp. 27–37, 1998). FIG. 1 illustrates a related art optical pick up, schematically.

Referring to FIG. 1, the related art optical pickup is provided with a laser diode 21, a light source, for emitting a laser beam, which reaches to a specific data bit position on a disk 27 surface via optical system elements arranged properly, such as a collimating lens or collimator 22, converging lenses 24, 26 and 28, beam splitter 23, and a mirror 30 on a 45° sloped surface of a submount 25, reflected at the disk surface 27 again, and comes to a photodiode 29 for detecting an optical signal, thereby determining a digital code(0 or 1) of the specific data. The mirror 30 makes a fine movement so that the laser beam finds the data at the specific position on the optical disk, which is controlled by a position controller, such as a voice coil actuator.

However, the related art optical pickup has the following problems. First, the related art optical system is, not only restricted merely to positioning of an incident light, such as positioning of the light source, variation of a reflection angle, and the like, but also poor in accuracy of the positioning of the light.

Second, the numerous components in the related art optical system causes the optical system large and complicated, to deteriorate mass productivity and have a high cost.

SUMMARY OF THE INVENTION

Accordingly, the present invention is directed to a micro-mirror device and an optical pick-up system of the same that substantially obviates one or more of the problems due to limitations and disadvantages of the related art.

An object of the present invention is to provide a micro-mirror device and an optical pick-up system of the same, in which a positioning function and an optical signal detecting function are integrated, for reducing components of the optical system, and simplifying the optical system.

Other object of the present invention is to provide a micro-mirror device and an optical pick-up system of the same, in which a micro drive mirror is used for improving accuracy of positioning of an incident light.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the micro-mirror device includes a mirror driver on a substrate, a beam splitting mirror part movable in an up or down direction in parallel by the mirror driver for fine adjusting of a position of a beam, reflecting the beam, and transmitting a portion of the beam, and an optical detector under the beam splitting mirror part for sensing the beam passed through the beam splitting mirror part, wherein the optical detector is either a pn junction photodiode, or a pin junction photodiode.

The mirror driver includes a piezoelectric actuator adapted to deform according to an external control signal, a connecting part connected between the beam splitting mirror part and the piezoelectric actuator for transferring the deformation of the piezoelectric actuator to the beam splitting mirror part for shifting the beam splitting mirror part, and a controller for controlling the deformation of the piezoelectric actuator, and the piezoelectric actuator includes a spacer formed at an edge of the micro-mirror device to a thickness, a cantilever spaced a distance from a surface of the substrate, and a piezoelectric body formed on or in the cantilever.

The beam splitting mirror part includes a mirror for reflecting a portion of an incident light and transmitting the other portion of the light, and a transparent supporter formed beneath the mirror for supporting the mirror, wherein the mirror is either a grating halfmirror or a Fresnel lens.

In other aspect of the present invention, there is provided an optical pick up system of a micro-mirror device including a light source module for emitting a light, a first and a second focusing parts for focusing the light emitted from the light source module onto a surface of an optical recording medium, and the micro-mirror device between the first and second focusing parts for fine adjustment of a position of the light incident through the first focusing part, reflecting to the optical recording medium through the second focusing part, sensing the light re-reflected at the optical recording medium, and converting into an electrical signal.

Thus, by integrating/packing optical components, such as the mirror, the optical signal detecting photodiode, and the beam positioning device, a micro optical system can be fabricated, and by simplifying an optical system assembly process, a mass productivity is increased and a production cost is saved, and by using the parallel driven micro actuator, beam positioning can be made to a nanometer level.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 2A:
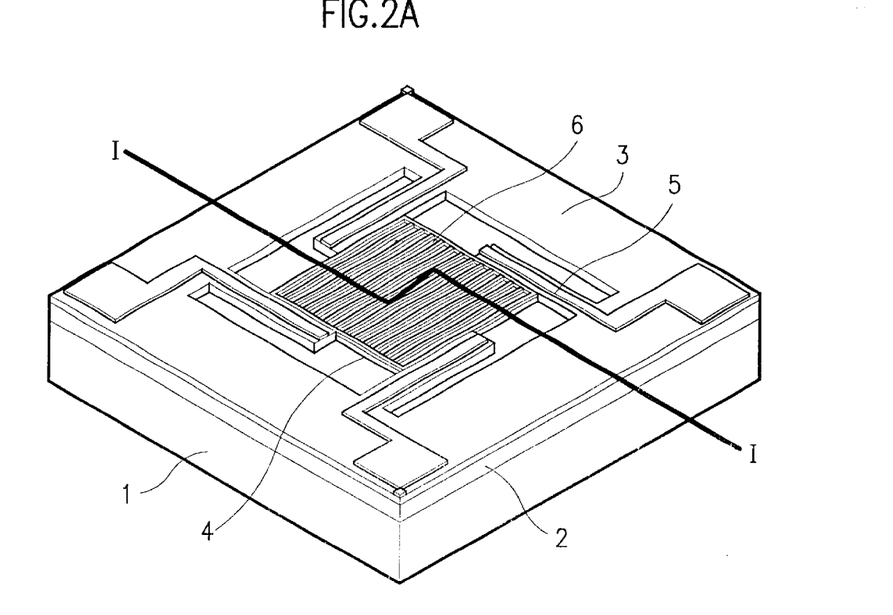
FIG. 2A illustrates a perspective view of a micro-mirror device in accordance with a preferred embodiment of the present invention.

Reference will now be made in detail to the preferred embodiments of the present invention, examples of which are illustrated in the accompanying drawings. FIG. 2A illustrates a perspective view of a micro-mirror device in accordance with a preferred embodiment of the present invention, and FIG. 2B illustrates a perspective view of a section along a line I—I in FIG. 2A showing an inside structure of the micro-mirror device.

Figure 2B:
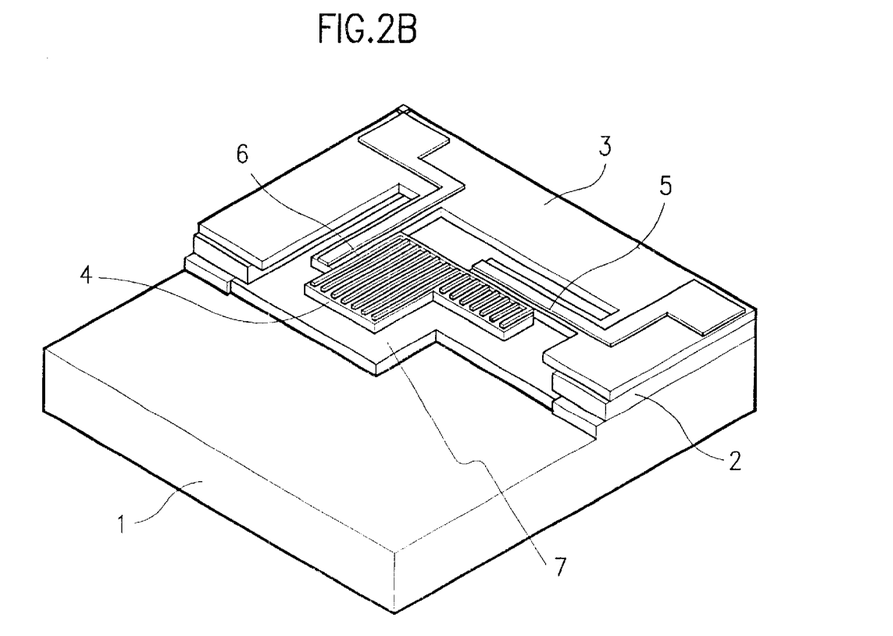
FIG. 2B illustrates a perspective view of a section along a line I—I in FIG. 2A showing an inside structure of the micro-mirror device.
Figure 3:
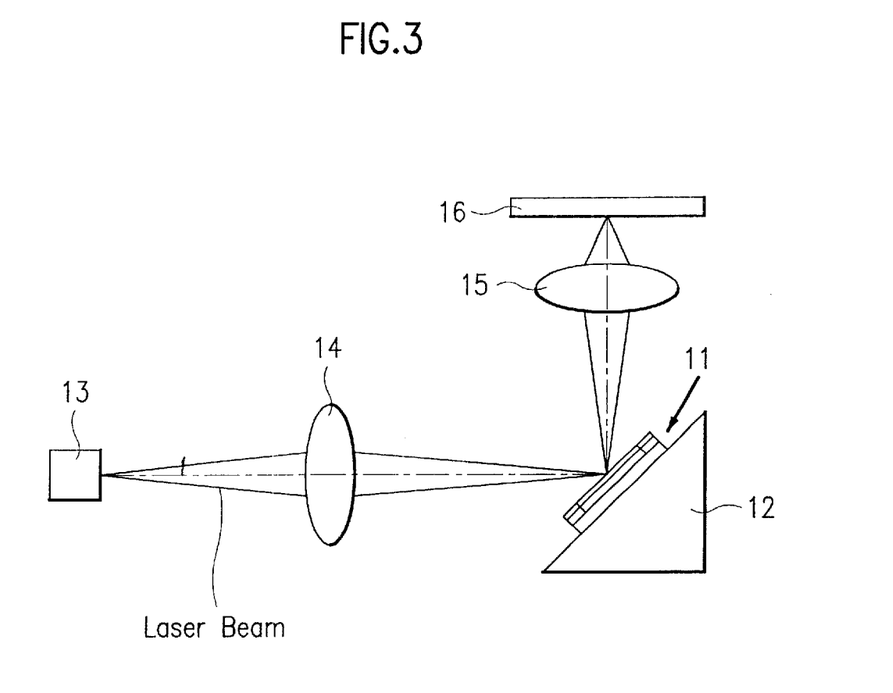
FIG. 3 illustrates an optical pickup of the micro-mirror device of the present invention, schematically.

Referring to FIG. 2A~2B, the micro-mirror device in accordance with a preferred embodiment of the present invention includes a mirror driver for driving a beam splitting mirror, a beam splitting mirror part movable in up and down by the mirror driver, and an optical detector under the beam splitting mirror part for detecting a light transmitted through the beam splitting mirror part. The optical detector has a pn or pin junction photodiode 7 formed by doping, such as ion implantation or diffusion, in or on a silicon substrate to an area as much as required. And, there may be an anti-refraction coating 8 formed on a surface of the photodiode 7 additionally for minimizing a reflection loss of the beam. The mirror driver has a piezoelectric actuator having a body 3 and a cantilever 5, a connection hinge (not shown) for connecting the piezoelectric actuator and the beam splitting mirror part, and a controller (not shown) for controlling a displacement of the piezoelectric actuator. The body 3 of the piezoelectric actuator is spaced a distance away from the surface of the photodiode 7 at a central portion of the substrate 1 by a spacer 2 formed at edges of the substrate 1 to a thickness. The cantilevers 5 spaced from the surface of the photodiode 7 are formed in symmetry with respect to the beam splitting mirror part, and connected by the connection hinge to a supporter 4 for the beam splitting mirror part. The symmetric cantilevers shown in FIGS. 2A~2B are exemplary, and, therefore, the symmetric cantilevers may be formed in a variety of types. The beam splitting mirror part has a mirror 6 for reflecting a portion of incident light and transmitting the other portion of incident light, and the transparent supporter 4 under a bottom surface of the mirror 6 for supporting the mirror 6. The mirror 6 has a form of a grating half mirror or a Fresnel lens of a material with a high reflectivity to an incident light. Alkie the cantilever 3, the transparent supporter 4 in the beam splitting mirror part is spaced a distance from the surface of the photodiode 7. The aforementioned micro-mirror device of the present invention has the beam splitting mirror for fine positioning of a light, the photodiode for detecting an optical signal, and a micro actuator for driving the beam splitting mirror, three of which are integrated together, a very simple structured optical pickup can be fabricated, if the micro-mirror device is applied thereto. FIG. 3 illustrates an optical pickup of the micro-mirror device of the present invention schematically.

Referring to FIG. 3 the optical pickup of the present invention includes a laser beam source 13, a first and second focusing lenses 14 and 15, and a parallel driven beam splitting micro-mirror device 11 on a 45° slope of a submount 12.

The operation of the optical pickup of the present invention will be explained.

Figure 4:
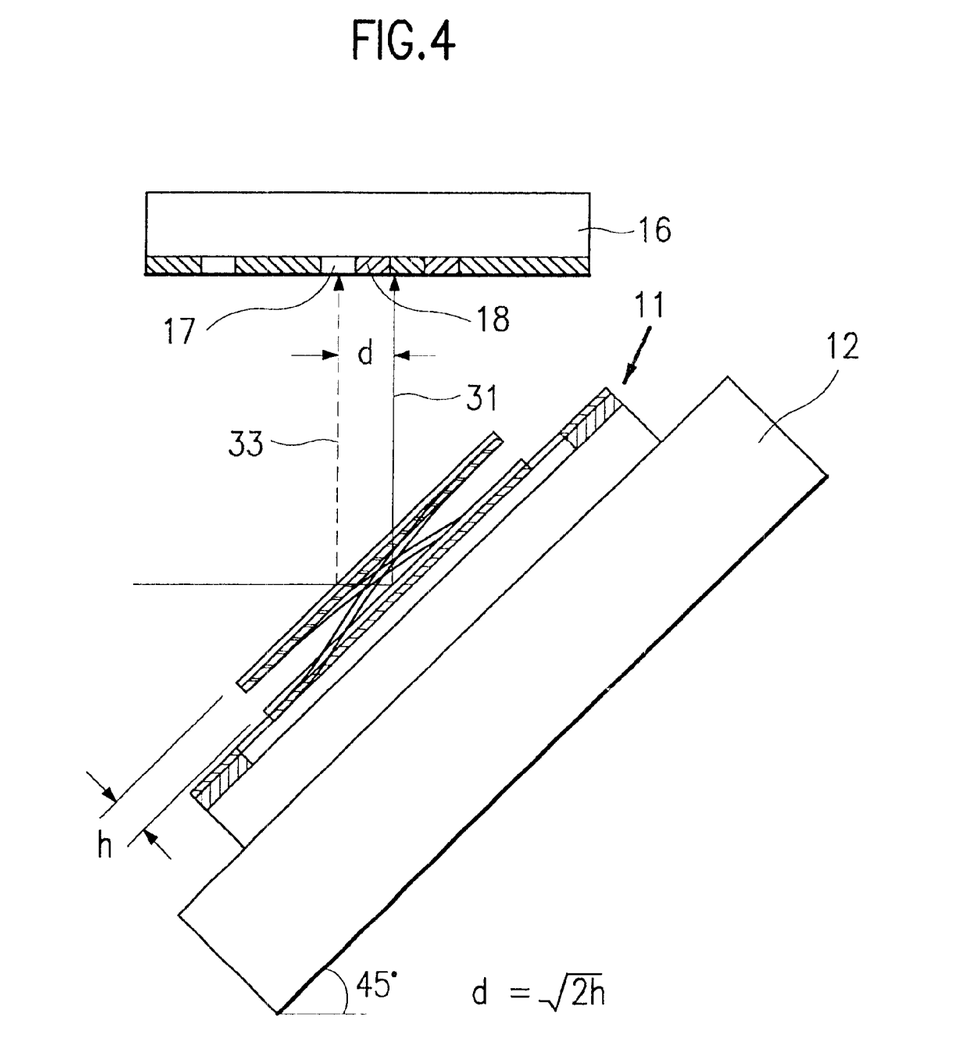
FIG. 4 illustrates a section showing reflection of writing/reading laser beam at a parallel driven beam splitting micro-mirrors.

A writing/reading laser beam emitted from the laser beam source 13 is incident to the first focusing lens 14, and focused onto the parallel driven beam splitting micro-mirror device 11 having photodiodes integrated thereon by the first focusing lens 14, and a portion of which laser beam is reflected at the parallel driven beam splitting micro-mirror device 11, and incident to the second focusing lens 15, and focused onto a data mark position of the optical disk 16 at which the data will be written/read. The parallel driven beam splitting micro-mirror device 11, mounted on the submount 12 at 45° from a path of the laser beam, makes fine variation of a laser beam path, for making fine adjustment of a position of the laser beam focused onto the optical disk 16. That is, by varying the position of the laser beam by an increment smaller than the data track pitch, the track pitch of the high density data mark can be find out, accurately. Then, the laser beam, focused onto the data mark written on the optical disk 16, is reflected at the data mark, and reveres the optical path to passes through the second focusing lens 15 and be incident to the photodiode of the micro-mirror device 11, where the data is determined. The photodiode in the micro-mirror device 11 converts the laser beam incident from the second focusing lens 15 into an electric signal which includes information recorded on the optical disk 16. Thus, the micro-mirror device of the present invention is advantageous in that an accuracy of a data pitch tracking of the optical disk can be enhanced by using the parallel driven beam splitting micro-mirror device 11 fitted to the 45° submount 12, and reduce a size of the optical system to a minimum as no collimator is required. The operation principle of the parallel driven beam splitting micro-mirror device, which is a core of the present invention in the optical pickup having the foregoing advantages, will be explained in detail. FIG. 4 illustrates a section showing reflection of writing/reading laser beam at a parallel driven beam splitting micro-mirrors, wherein it can be known that by making a precise control of a position of the parallel driven beam splitting micro-mirror, a beam path of the reflected laser beam can be controlled, precisely.

Referring to FIG. 4, a micro-mirror formed over the substrate, with the micro-mirror released from the substrate, by micromachining makes a fine movement in up/down directions according to deformation of the piezoelectric actuator connected to the micro-mirror. That is, the micro-mirror makes a parallel deformation 'h' in proportion to voltage/current applied to an external controller. This parallel deformation 'h' causes to change of a beam axis of the incident laser beam by 'd', wherein a relation between 'd' and 'h' can be expressed as follows in view of the angle 45° between the incident laser beam and the submount 12.

$$d = \frac{h}{\tan 45°} = \sqrt{2}\, h$$

Therefore, as shown in FIG. 4, if the optical disk has reflectivity or absorption coefficient varied according to position, deformation of the micro-mirror is controlled by means of the piezoelectric actuator for controlling a beam path such that the laser beam 31 incident to an optical disk region 18 which absorbs a specific wavelength of the laser beam is incident to an optical disk region 17 having a high reflectivity, and the laser beams reflected at respective data regions of different optical properties return to the photodiodes integrated under the parallel driven beam splitting micro-mirror, to read information on respective data regions 17 and 18 of the optical disk 16. If such a device is applied to a bar code reader, a bar code information can be restored/determined through the foregoing process.

Figure 5A:
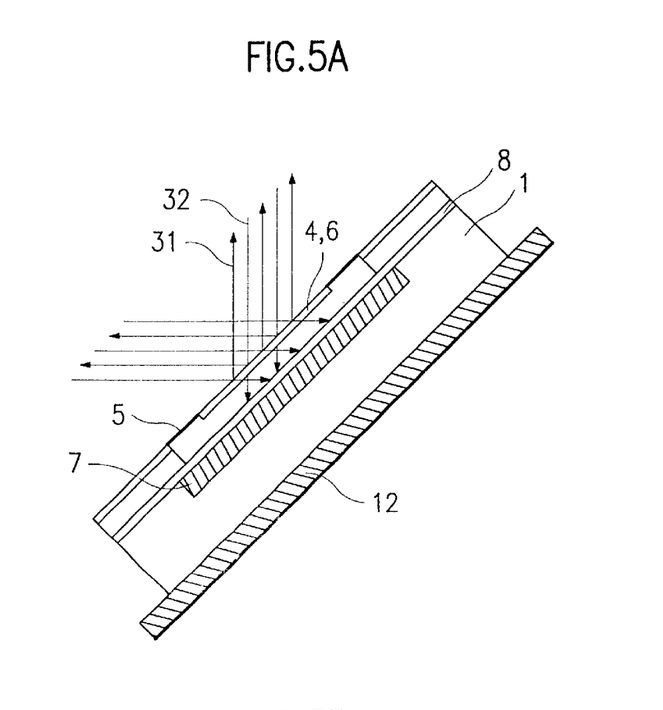
FIG. 5A illustrates a section showing reflection of a laser beam when no power is applied to a micro-mirror device of the present invention.
Figure 5B:
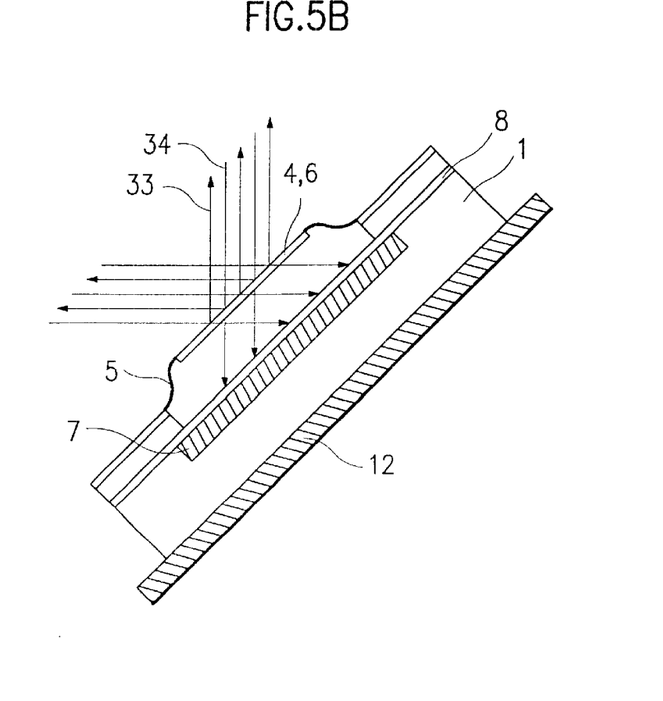
FIG. 5B illustrates a section showing reflection of a laser beam when a power is applied to a micro-mirror device of the present invention; and, FIG. 6 illustrates a graph showing digitizing of optical information by using an output current of a photodiode.

FIG. 5A illustrates a section showing reflection of a laser beam when no power is applied to a micro-mirror device of the present invention, and FIG. 5B illustrates a section showing reflection of a laser beam when a power is applied to a micro-mirror device of the present invention.

Figure 6:
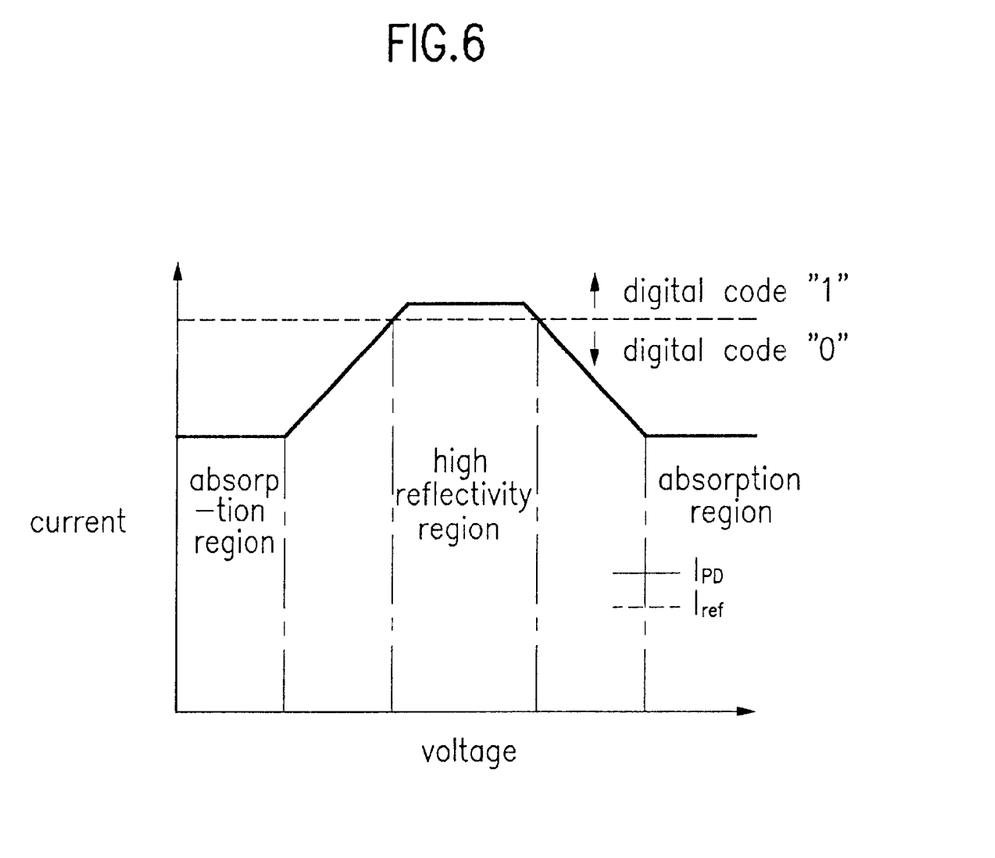

Referring to FIG. 5A, if no voltage is applied to electrodes formed on an upper portion and a surface of the cantilever of the piezoelectric actuator S of the micro-mirror device fitted to the submount 12, there is no change in the piezoelectric actuator 5. Therefore, a portion of the laser beam is reflected at the mirror 6 supported on the transparent supporter 4 toward the optical disk, and rest of the laser beam is incident to the photodiode 7 through the anti-refraction coating 8. And, the laser beam 31 reflected toward optical disk 31 is re-reflected at the optical disk, carrying information on the optical disk positioned on the path, and a portion of the re-reflected laser beam 32 transmits the mirror 4 and incident to the photodiode 7, and the rest of the re-reflected laser beam 32 is reflected at the mirror 4. On the other hand, as shown in FIG. 5B, if a driving voltage is applied to the electrodes, the piezoelectric actuator 5 is strained to move the mirror 4 in a vertical direction. Consequently, a portion 33 of the laser beam is reflected at the moved mirror 4 in a different path toward the optical disk, and rest of the laser beam is incident to the photodiodes 7 through the anti-refraction coating 8. And, the laser beam 34 reflected toward the optical disk is re-reflected at the optical disk, carrying information on the optical disk positioned on the path, a portion of which transmits the mirror 4 and is incident to the photodiodes 7, and the rest of which reflected at the mirror 4. In this instance, the photodiode 7 senses a light which carries the information re-reflected at the optical disk. An output of the photodiode that senses the light is used for digitizing light information as shown in FIG. 6. First, an output current $I_{PD}$ of the photodiode varied with an amount of received light or a light intensity at the photodiode is compared to a digitizing reference current (or threshold current) $I_{ref}$. In this instance, a case when the output current of the photodiode is greater than the reference current is determined to be a case when the laser beam is reflected at the region of a high reflectivity in the information region of the optical disk, and is given a digital code "1", and, a case when the output current of the photodiode is smaller than the reference current is determined to be a case when the laser beam is reflected at the absorption region, and is given a digital code "0". In this instance, the output current of the photodiode comes from a sum of light of a portion of the laser beam from the light source, and a portion of the laser beam reflected at the optical disk. A distinguishable geometric size of a data bit is dependent both on an operative resolution of the parallel driven beam splitting micro-mirror and a size of a focus of the light reflected at the mirror and focused on the optical disk. In this instance, since the operative resolution of the micro actuator can realize a few tens of nanometer with easy, a lower limit of a distinguishable minimum data bit size is determined by a wavelength of an incident light and an NA (Numerical Aperture), at the end.

Thus, the micro-mirror device and the optical pick-up system of the same of the present invention can reduce fabrication/alignment processes, and improves an alignment accuracy because the optical system can be integrated by micro-machining and photo etching.

And, the combination of the micro beam positioning feature and the beam focusing function permits the present invention applicable to a high density light information storage, as well as to a closed loop control in which a mirror drive and an optical characteristic change by the drive are detected, and a detected optical signal is used as a feedback signal for driving the mirror.

And, the parallel driving of the mirror to a plane can enhance a spatial resolution of beam positioning compared to a mirror tilting system used in DMD or beam scanner, that permits to apply to a pickup for a high density optical information storage. Other than these, the present invention has a wide application, such as optical information storage system, super precision laser beam scanner, optical steering device, and the like.

As has been explained, the micro-mirror device and the optical pick-up system of the same has the following advantages.

By integrating/packing optical components, such as the mirror, the optical signal detecting photodiode, the beam positioning device, the present invention can fabricate a micro optical system. And by using silicon semiconductor fabrication process and micro-machining, a production cost can be saved, uniform devices can be fabricated, and a number of components can be reduced, and an assembly process of the optical system components can be reduced significantly.

And, by using the parallel driven micro actuator, beam positioning can be made to a nanometer level, and information on an optical medium distinguishable by means of the positioned beam can be read by using integrated photodiodes.

It will be apparent to those skilled in the art that various modifications and variations can be made in the micro-mirror device and an optical pick-up system of the same of the present invention without departing from the spirit or scope of the invention. Thus, it is intended that the present invention cover the modifications and variations of this invention provided they come within the scope of the appended claims and their equivalents.

What is claimed is:

1. A micro-mirror device comprising:
   a mirror driver on a substrate;
   a beam splitting mirror part movable in an up or down direction by the mirror driver in parallel to the substrate for fine adjusting of a position of a beam, reflecting the beam, and transmitting a portion of the beam; and,
   an optical detector under the beam splitting mirror part for sensing the beam passed through the beam splitting mirror part.

2. A micro-mirror device as claimed in claim 1, wherein the mirror driver includes;
   a piezoelectric actuator adapted to deform according to an external control signal,
   a connecting part connected between the beam splitting mirror part and the piezoelectric actuator for transferring the deformation of the piezoelectric actuator to the beam splitting mirror part for shifting the beam splitting mirror part, and
   a controller for controlling the deformation of the piezoelectric actuator.

3. A micro-mirror device as claimed in claim 2, wherein piezoelectric actuator includes;
   a spacer formed at an edge of the micro-mirror device to a thickness,
   a cantilever spaced a distance from a surface of the substrate, and
   a piezoelectric body formed on or in the cantilever.

4. A micro-mirror device as claimed in claim 3, wherein the cantilever is formed spaced a distance from, and symmetric with respect to the beam splitting mirror part.

5. A micro-mirror device as claimed in claim 1, wherein the beam splitting mirror part includes;
   a mirror for reflecting a portion of an incident light and transmitting the other portion of the light, and
   a transparent supporter formed beneath the mirror for supporting the mirror.

6. A micro-mirror device as claimed in claim 5, wherein the mirror is either a grating half mirror or a Fresnel lens.

7. A micro-mirror device as claimed in claim 1, wherein the optical detector is either a pn junction diode, or a pin junction diode.

8. A micro-mirror device as claimed in claim 1, wherein the optical detector has an anti-refraction coating applied to a surface thereof.

9. A micro-mirror device as claimed in claim 1, wherein the beam splitting mirror part is formed spaced a distance from the optical detector.

10. A micro-mirror device comprising:
    a substrate;
    a piezoelectric actuator on the substrate adapted to deform according to an external control signal;
    a beam splitting mirror for fine adjusting a position of an incident light, and reflecting a portion of the light and transmitting the other portion of the light;
    a transparent supporter beneath the beam splitting mirror for supporting the beam splitting mirror;
    a connecting hinge connected to the piezoelectric actuator and the transparent supporter for transferring a deformation of the piezoelectric actuator to the transparent supporter for shifting the beam splitting mirror; and,
    an optical detector on the substrate under the beam splitting mirror for sensing the light transmitted through the beam splitting mirror.

11. A micro-mirror device as claimed in claim 10, wherein piezoelectric actuator includes;
    a spacer formed at an edge of the micro-mirror device to a thickness,
    a cantilever connected to the spacer and spaced a distance from a surface of the substrate, and
    a piezoelectric body formed on or in the cantilever.

12. A micro-mirror device as claimed in claim 11, wherein the cantilever is formed spaced a distance from, and symmetric with respect to the beam splitting mirror part.

13. A micro-mirror device as claimed in claim 10, wherein the mirror is either a grating half mirror or a Fresnel lens.

14. A micro-mirror device as claimed in claim 10, wherein the optical detector is either a pn junction diode, or a pin junction diode.

15. A micro-mirror device as claimed in claim 10, wherein the optical detector has an anti-refraction coating applied to a surface thereof.

16. A micro-mirror device as claimed in claim 10, wherein the transparent supporter supporting the beam splitting mirror part is formed spaced a distance from the optical detector.

17. An optical pick up system of a micro-mirror device comprising:
    a light source module for emitting a light;
    a first and a second focusing parts for focusing the light emitted from the light source module onto a surface of an optical recording medium; and,
    the micro-mirror device between the first and second focusing parts for fine adjustment of a position of the light incident through the first focusing part, reflecting to the optical recording medium through the second focusing part, sensing the light re-reflected at the optical recording medium, and converting into an electrical signal.

18. An optical pick up system as claimed in claim 17, wherein the micro-mirror device is positioned on a 45° sloped surface of a sub-mount.

* * * * *